United States Patent
Koyanagi et al.

[11] 3,944,987
[45] Mar. 16, 1976

[54] DIGITAL LOGICAL SEQUENCE CONTROLLER

[75] Inventors: Haruo Koyanagi, Tokyo; Masayoshi Takahashi, both of Japan; Nobuharu Yamauchi, Amagasaki; Masaji Matsumura, Amagasaki; Katsuhide Morimoto, Amagasaki, all of Japan

[73] Assignees: Mitsubishi Denki Kabushiki Kaisha, Tokyo; Nissan Motor Company, Limited, both of Japan

[22] Filed: May 6, 1974

[21] Appl. No.: 467,142

[30] Foreign Application Priority Data
May 7, 1973 Japan.................. 48-50420

[52] U.S. Cl. ................................. 340/172.5
[51] Int. Cl.² .................. G05B 11/01; G06F 9/00
[58] Field of Search ......... 340/172.5; 235/152, 197; 307/207

[56] References Cited
UNITED STATES PATENTS

| | | | |
|---|---|---|---|
| 3,686,639 | 8/1972 | Fletcher............................ | 340/172.5 |
| 3,753,243 | 8/1973 | Ricketts, Jr. et al............. | 340/172.5 |
| 3,806,714 | 4/1974 | Otsuka et al..................... | 235/152 |
| 3,810,118 | 5/1974 | Kiffmeyer......................... | 340/172.5 |
| 3,849,765 | 11/1974 | Hamano............................ | 340/172.5 |

OTHER PUBLICATIONS

G. Lapidus, "Programmable Logic Controllers—Painless Programming to Replace the Relay Bank", *Control Engineering*, Apr. 1971, pp. 49–60.
N. Andreiev, "Programmable Logic Controllers—An Update", *Control Engineering*, Sept. 1972, pp. 45–47.

*Primary Examiner*—David H. Malzahn
*Attorney, Agent, or Firm*—Oblon, Fisher, Spivak, McClelland & Maier

[57] ABSTRACT

A sequence controller of the digital logical circuit type, comprising a sequence program part and a processing circuit, wherein the desired sequence instruction is read from the sequence program part, and the sequence is processed and controlled by the processing circuit. A certain definite level is set at a branch point in an equivalent sequential circuit according to the path along which a signal of the sequential circuit is transmitted. This level and the on-off state of the branch point are stored in a memory. The given data are processed and controlled through the sequence program part and the memory.

5 Claims, 6 Drawing Figures

DIGITAL LOGICAL SEQUENCE CONTROLLER

BACKGROUND OF THE INVENTION

1. Field of the Invention

The present invention relates to sequence controllers of the digital logical circuit type, in which the desired sequence instruction is read from its sequence program part, and the sequence is processed and controlled in its processing circuit.

2. Description of the Prior Art

Being indispensable in the present-day industrialized society, the sequence control technique is widely used in the field of industrial process control, such as power plant and substation control, conveyor system control, machine tool control, assembly line control in the automotive plant, and rolling line control. For these controls, the contact relay sequence control has long been used. This type of sequence control, however, is inconvenient for applications where design modifications are often made on a control system, resulting in degradation of reliability. Recently, the controlled objectives have become much more sophisticated which has necessitated the use of an increasing number of relays, with the result that the logical design has become intricate and the approach to higher speed control has become more difficult.

One solution to this problem in the prior art is the sequence controller with computer-like control functions adapted to sequence controls, in which a program (i.e., a pattern of sequence control operation) is stored in a core memory by way of the keyboard according to a predetermined specific format, the process state is sampled at certain time intervals and compared with the stored data, and an output is generated according to the result.

This sequence controller operates in general on flowchart system or Boolean algebraic system (conversion system) through programming. When a relay sequence is programmed for a computer, the necessary logical operation is expressed in terms of Boolean algebra, which is programmed and stored in a core memory of the sequence controller. This Boolean algebraic system offers high processing efficiency.

This programming control will be described by way of example with reference to FIGS. 1 through 3. A sequence diagram as shown in FIG. 1 may be expressed by Boolean algebraic equations as follows.

$$Y_1 = (X_1 + X_3) \cdot \overline{X_2} = X_1 \cdot \overline{X_2} + X_3 \cdot \overline{X_2} \quad (1)$$

$$Y_2 = X_4 \cdot X_5 + \overline{X_6} \quad (2)$$

where $X_1$ to $X_6$ stand for input contacts, among which $X_1$, $X_3$, $X_4$ and $X_5$ are make-contacts which close the individual circuits when the coil is excited, and $X_2$ and $X_6$ are break-contacts which open the individual circuits when the coil is excited; and $Y_1$ and $Y_2$ denote output relays.

FIG. 2 is a block diagram showing a conventional digital logical circuit type sequence controller with functions equivalent to those of the above-mentioned relay sequence circuit. In FIG. 2, $X_1$, $X_2$, $X_3$, ... denote contacts of external inputs, and the numeral 1 represents an input selection circuit which selects the necessary input contact and supplies datum of the state of the selected input contact to a logical processing circuit 2 which is capable of performing a given sequence processing. The numeral 3 denotes an output control circuit which holds the specific output relays $Y_1$ and $Y_2$ in on or off state according to the processed result reached by the processing circuit 2. The numeral 4 represents a sequence program storage circuit which stores sequence programs and reads them in sequence and supplies the read program to the processing circuit 2. An example of this processing circuit is illustrated in block form in FIG. 3, in which $FF_1$, $FF_2$ and $FF_3$ denote flip-flop circuits, AND a logical AND circuit, OR a logical OR circuit, and $G_1$ to $G_5$ gates. This circuit performs processing as summarized below in reference to $Y_1$ as in Eq. (1).

| Memory Address | Sequence Instruction | Processing |
|---|---|---|
| 1 | LOAD $X_1$ | ① $X_1 \rightarrow FF_1$ |
| | | ② $FF_1 \rightarrow FF_2$ |
| | | ③ $0 \rightarrow FF_3$ |
| 2 | AND $\overline{X_2}$ | ① $\overline{X_2} \rightarrow FF_1$ |
| | | ② $FF_1 \cdot FF_2 \rightarrow FF_2$ |
| 3 | OR $X_3$ | ① $X_3 \rightarrow FF_1$ |
| | | ② $FF_2 + FF_3 \rightarrow FF_3$ |
| | | ③ $FF_1 \rightarrow FF_2$ |
| 4 | AND $\overline{X_2}$ | ① $\overline{X_2} \rightarrow FF_1$ |
| | | ② $FF_1 \cdot FF_2 \rightarrow FF_2$ |
| 5 | SET $Y_1$ | ② $FF_2 + FF_3 \rightarrow FF_3$ |
| | | ③ $FF_3 \rightarrow OUT\ Y_1$ |

(Note: The numerals ①, ②, and ③ indicate the timing sequence for the processing.)

When a sequence instruction LOAD $X_1$ at memory address 1 is read from a memory in the sequence program storage circuit 4, this instruction is decoded and the state of input contact $X_1$ is stored in the flip-flop $FF_1$. Then the gates $G_1$ and $G_3$ are opened whereby the data in the flip-flop $FF_1$ is transferred to the flip-flop $FF_2$, and the binary code "0" is stored as an initial set signal in the flip-flop $FF_3$. Then, when another sequence instruction AND $\overline{X_2}$ at address 2 is read from a memory in the sequence program storage circuit 4, the state of complement $\overline{X_2}$ of input contact $X_2$ is stored in the flip-flop $FF_1$, and the gate $G_2$ is opened whereby the flip-flops $FF_1$ and $FF_2$ undergo AND logic and the result is stored in the flip-flop $FF_2$. The state of input contact $X_3$ is stored in the flip-flop $FF_1$ by another sequence instruction OR $X_3$. Then the gate $G_4$ is opened whereby the flip-flops $FF_2$ and $FF_3$ undergo OR logic, and the result is transferred to the flip-flop $FF_3$. After this step, the gate $G_1$ is opened whereby the datum stored in the flip-flop $FF_1$ is transferred to the flip-flop $FF_2$. When an instruction AND $\overline{X_2}$ at address 4 is read, the same processing as performed by the instruction at address 2 is carried out. Then, when an instruction SET $Y_1$ at address 5 comes in, the gate $G_4$ is opened whereby the flip-flops $FF_2$ and $FF_3$ undergo OR logic, and the result is transferred to the flip-flop $FF_3$. After this step, the gate $G_5$ is opened to allow the datum in the flip-flop $FF_3$ to be delivered to the output relay $Y_1$ through the output control circuit 3.

Thus, the Boolean algebraic equation, $X_1 \cdot \overline{X_2} + X_3 \cdot \overline{X_2} = Y_1$, is executed by the sequence instructions at addresses 1 to 5. In the same manner, Boolean algebraic equations expressed by polynomials of AND and OR can be converted into sequence instructions one after another. The sequence instructions are read one after another from the memory of the sequence program storage circuit 4 and executed repeatedly at high speed. Hence the sequence controller shown in FIG. 2 performs functions equivalent to those of the relay sequence shown in FIG. 1. When the relay sequence forms a loop as shown in FIG. 4, this sequence may be expressed in Boolean algebra as follows.

$$Y_1 = X_1 \cdot \overline{X_2} + X_4 \cdot X_3 \cdot \overline{X_2} + X_4 \cdot X_5 \overline{X_6} + X_1 \cdot X_3 \cdot X_5 \cdot \overline{X_6} \quad (3)$$

$$Y_2 = X_4 \cdot X_5 + X_1 \cdot X_3 \cdot X_5 + X_1 \cdot \overline{X_2} \cdot \overline{X_6} + X_4 \cdot X_3 \cdot \overline{X_2} \cdot \overline{X_6} \quad (4)$$

Because all the loops are to be considered, these Boolean equations are inevitably complicated. If the relay sequence comprises intricate loops, it will become extremely difficult to convert all the logical paths into Boolean equations, and a considerable amount of effort must be made to build a complete sequence program.

SUMMARY OF THE INVENTION

An object of the invention is to provide an improved sequence controller free of the prior art drawbacks.

Another object of the invention is to provide a sequence controller with which a sequence program can readily be constructed.

Still another object of the present invention is to provide a sequence controller which is readily adaptable to a variety of sequence control applications.

A further object of the invention is to provide a sequence controller which meets the above objects yet is low in cost.

Other objects will appear hereinafter.

These and other objects are achieved in accordance with the present invention which utilizes a sequence controller of the digital logical circuit type capable of operation in which a necessary sequence instruction is read from the sequence program storage and the sequence is processed by the processing circuit; and which includes a certain definite level set at a branch point in an equivalent sequence circuit according to the path along which the signal of the sequence circuit is transmitted. This level and the on-off state of the branch point are stored in a memory, and given data are processed through the sequence program storage and the memory.

DETAILED DESCRIPTION OF THE PREFERRED EMBODIMENTS

Figure 1:
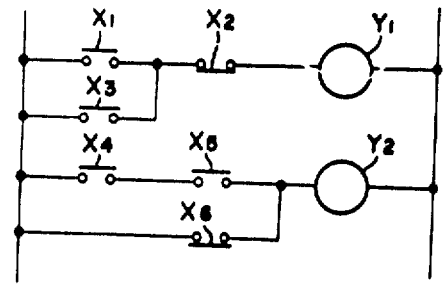
FIG. 1 is a diagram showing an example of a relay sequence.
Figure 2:
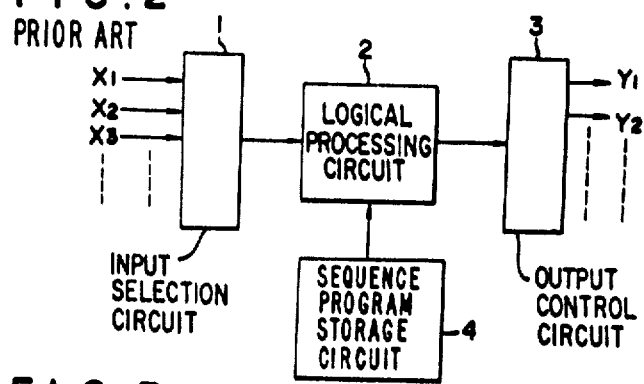
FIG. 2 is a block diagram showing an example of a conventional sequence controller.
Figure 3:
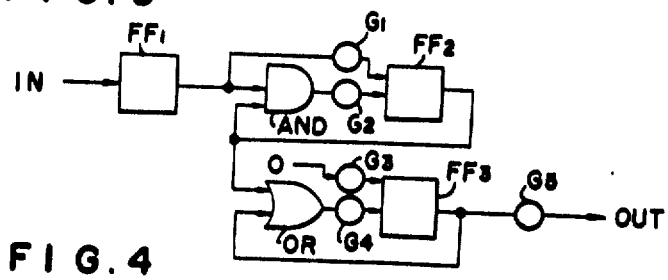
FIG. 3 is a block diagram of a processing circuit used with the sequence controller shown in FIG. 2.
Figure 5:
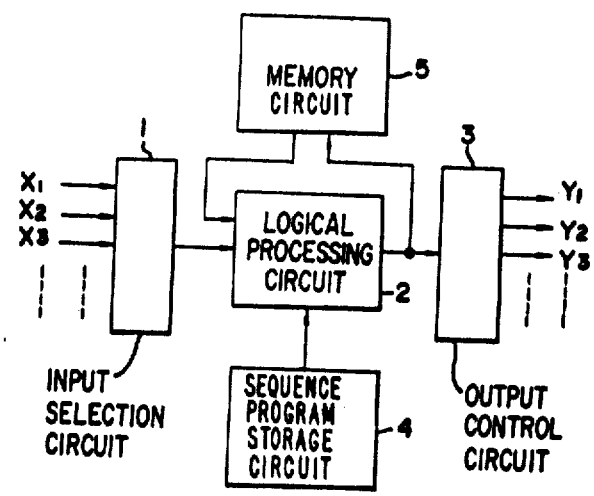
FIG. 5 is a block diagram showing a sequence controller according to the invention.
Figure 6:
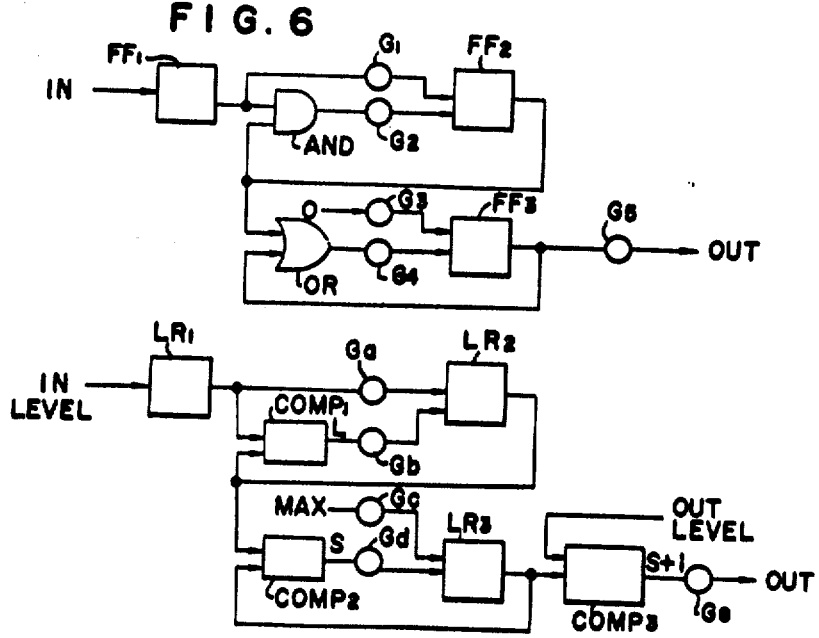
FIG. 6 is a block diagram showing a processing circuit used with the sequence controller shown in FIG. 5.

One embodiment of the invention will be described by referring to FIG. 5. Like constituent elements are indicated by the indentical symbols in FIGS. 2 and 5. In FIG. 5, the numeral 5 denotes a memory which stores the on-off state of a branch relay point i.e., a branch point where an input contact is connected to another input contact or to an output relay contact on a sequence diagram, and which also stores a level corresponding to the number of relay points through which a signal passes so as to turn on one relay point. FIG. 6 shows in block form a processing circuit 2 as in FIG. 5. Like constituent elements are indicated by the identical references in FIGS. 3 and 6. In FIG. 6, $LR_1$, $LR_2$ and $LR_3$ denote level registers indicating levels at the relay points, $COMP_1$ denotes a comparator which compares two levels with each other and generates an output of the larger level, $COMP_2$ denotes a comparator which compares two levels with each other and generates an output of the smaller level, $COMP_3$ denotes a comparator and adder which compares two levels with each other and generates an output of the smaller level plus 1, and $Ga$ to $Ge$ denote gates of level data. The symbol MAX represents the maximum number of levels which can be stored in the level register $LR_3$.

The operation of this sequence controller will be described below by referring to the sequence diagram shown in FIG. 4. The relay sequence may be expressed in terms of Boolean algebra as follows.

$$P_1 = X_1 + X_3 \cdot P_3 + \overline{X_2} \cdot P_2 \quad (5)$$

$$P_2 = \overline{X_2} \cdot P_1 + \overline{X_6} \cdot P_4 \quad (6)$$

$$P_3 = X_4 + X_3 \cdot P_1 + X_5 \cdot P_4 \quad (7)$$

$$P_4 = X_5 \cdot P_3 + \overline{X_6} \cdot P_2 \quad (8)$$

$$Y_1 = P_2 \quad (9)$$

$$Y_2 = P_4 \quad (10)$$

where $P_1$, $P_2$, $P_3$ and $P_4$ represent relay points (branch points) at which input contacts $X_1$ to $X_6$ and/or relay contacts $Y_1$ and $Y_2$ are connected to each other.

The on-off states of the relay points $P_1$ to $P_4$ are stored in a memory 5 whereby these relay points may be regarded to be equivalent to the input contacts. Then, assume that the input contact $X_1$ turns on whereby the relay point $P_1$ turns on, and the input contact $X_3$ turns on whereby the relay point $P_3$ turns on, and then $X_1$ turns off. Theoretically, under this condition, the relay point $P_1$ assumes on-state depending on the condition of $X_3$ $P_3$, and the relay point $P_3$ remains in on-state depending on the condition of $X_3$ $P_1$, as opposed to the practically desired condition where both $P_1$ and $P_3$ are in off-state. This makes it impossible to indicate any off-state on a practical relay sequence diagram. To solve this problem, levels are set at the individual relay points $P_1$ through $P_4$, so that one level is higher by 1 than another as a signal proceeds from one relay point to another. By so setting the levels, a relay point where the level is low cannot be turned on from a relay point where the level is high. By this arrangement, the input contact $X_1$ turns on whereby the relay point $P_1$ turns on (level 1), and the input contact $X_3$ turns on whereby the relay point $P_3$ turns on (level 2). After this step, when the input contact $X_1$ turns off, the relay point $P_1$ (level 1) turns off since the condition of $X_3$ $P_3$ is level 2. Accordingly, the relay point $P_3$ turns off. Thus the on and off states correspond to the actual sequence diagram. (Note: The input contacts $X_1$, $X_2$, . . . always stand at level 0.)

To illustrate the invention, the operations of this relay sequence are summarized below in terms of Boolean algebra, Eq. (5), $P_1 = X_1 + X_3 \cdot P_3 + \overline{X_2} \cdot P_2$.

| Memory Address | Sequence Instruction | | Processing | |
|---|---|---|---|---|
| 1 | LOAD $X_1$ | ① $X_1 \rightarrow FF_1$<br>② $FF_1 \rightarrow FF_2$<br>③ $0 \rightarrow FF_3$ | ① $L(X_1) \rightarrow LR_1$<br>② $LR_1 \rightarrow LR_2$<br>③ $MAX \rightarrow LR_3$ | |
| 2 | OR $X_2$ | ① $X_2 \rightarrow FF_1$<br>② $FF_1 + FF_3 \rightarrow FF_3$ | ① $L(X_2) \rightarrow LR_1$<br>② $LR_1 \rightarrow LR_3$ only when $FF_2 = 1$ and $LR_1 < LR_3$ | |
| 3 | AND $P_2$ | ③ $FF_3 \rightarrow FF_2$<br>① $P_2 \rightarrow FF_1$<br>② $FF_1 \cdot FF_2 \rightarrow FF_2$ | ③ $LR_3 \rightarrow LR_2$<br>① $L(P_2) \rightarrow LR_1$<br>② $LR_1 \rightarrow LR_2$ when $LR_1 > LR_2$ | |
| 4 | OR $\overline{X}_2$ | ① $\overline{X}_2 \rightarrow FF_1$<br>② $FF_1 + FF_3 \rightarrow FF_3$ | ① $L(\overline{X}_2) \rightarrow LR_1$<br>② $LR_1 \rightarrow LR_3$ only when $FF_2 = 1$ and $LR_1 < LR_3$ | |
| 5 | AND $P_1$ | ③ $FF_3 \rightarrow FF_2$<br>① $P_1 \rightarrow FF_1$<br>② $FF_1 \cdot FF_2 \rightarrow FF_2$ | ③ $LR_3 \rightarrow LR_2$<br>① $L(P_1) \rightarrow LR_1$<br>② $LR_1 \rightarrow LR_2$ when $LR_1 > LR_2$ | |
| 6 | SET $P_1$ | ① $FF_2 + FF_3 \rightarrow FF_3$<br>2 $FF_3 \rightarrow OUT P_1$<br>when $L(P_1) \geq LR_2$<br>$0 \rightarrow OUT P_1$<br>when $L(P_1) < LR_2$ | ① $LR_2 \rightarrow LR_3$ only when $FF_2 = 1$ and $LR_2 < LR_3$<br>② $LR_3 + 1 \rightarrow L(P_1)$ when $L(P_1) \geq LR_3$<br>$MAX \rightarrow L(P_1)$ when $L(P_1) < LR_3$ | |

(Note: The numerals ①, ②, and ③ indicate the timing sequence for the processing, and $X_1$, $X_2$, .....always stand at level 0.)

When a sequence instruction LOAD $X_1$ at address 1 is read from a memory in the sequence program part 4, this instruction is decoded, and the state of input contact $X_1$ is stored in the flip-flop $FF_1$. Then the gate $G_1$ is opened whereby the data in the flip-flop $FF_1$ is transferred to the flip-flop $FF_2$, and the binary code 0 is stored as an initial set in the flip-flop $FF_3$. On the other hand, the level 0 of the contact $X_1$ is registered in the level register $LR_1$, and the gate $Ga$ is opened whereby the data in the level register $LR_1$ is transferred to the level register $LR_2$. The level register $LR_3$ is initially set to a maximum value MAX. Then, when another sequence instruction OR $X_2$ at address 2 is read from the memory in the sequence program part 4, the state of input contact $X_2$ is stored in the flip-flop $FF_1$, the gate $G_4$ is opened, and a logic OR combination of flip-flops $FF_1$ and $FF_3$ by OR circuit OR is stored in the flip-flop $FF_3$. Then the gate $G_1$ is opened whereby the data in the flip-flop $FF_1$ is transferred to the flip-flop $FF_2$. The level 0 of input contact $X_2$ is stored in the level register $LR_1$. The gate $Gd$ opens only when the flip-flop $FF_2$ is on (i.e., $X_1$ is on). If the level of the level register $LR_1$ is smaller than that of the level register $LR_3$, the comparator $COMP_2$ generates an output of data in the level register $LR_1$, which is stored in the level register $LR_3$. Then the gate $Ga$ is opened whereby the data in the level register $LR_1$ is transferred to the level register $LR_2$. After this step, another sequence instruction AND $P_2$ at address 3 is given whereby the state of relay point $P_2$ is read from the memory 5. This data is stored in the flip-flop $FF_1$. Then the gate $G_2$ is opened whereby a logic AND combination of flip-flops $FF_1$ and $FF_2$ by AND circuit is stored in the flip-flop $FF_2$. The level of relay point $P_2$ which is stored in the memory 5 is registered in the level register $LR_1$. When the level of the level register $LR_1$ is larger than that of the level register $LR_2$, the comparator $COMP_1$ generates an output of data in the level register $LR_1$, which is stored in the level register $LR_2$ through the gate $Gb$. Then, by another sequence instruction OR $\overline{X}_2$ at address 4, the state of input contact $\overline{X}_2$ is stored in the flip-flop $FF_1$. The gate $G_4$ is opened and an OR logic combination of flip-flops $FF_1$ and $FF_3$ by OR circuit is stored in the flip-flop $FF_3$. After this step, the gate $G_1$ is opened whereby the data in the flip-flop $FF_1$ is transferred to the flip-flop $FF_2$. On the other hand, the level 0 of input contact $\overline{X}_2$ is registered in the level register $LR_1$. When the flip-flop $FF_2$ is on (i.e., both $P_2$ and $X_1$ are on), the gate $Gd$ opens. Thus, if the level of the level register $LR_1$ is smaller than that of the level register $LR_3$, the comparator $COMP_2$ generates an output of data in the level register $LR_1$, which is stored in the level register $LR_3$. Then the gate $Ga$ is opened whereby the data in the level register $LR_1$ is transferred to the level register $LR_2$. Next, by another sequence instruction AND $P_1$ at address 5, the state of the relay point $P_1$ is read from the memory 5, which is stored in the flip-flop $FF_1$. The gate $G_2$ is opened and a logical AND combination of flip-flops $FF_1$ and $FF_2$ by AND circuit is stored in the flip-flop $FF_2$. While the level of the relay point $P_1$ which is stored in the memory 5 is read and registered in the level register $LR_1$, the gate $Gb$ is opened and if the level of the level register $LR_1$ is larger than that of the level register $LR_2$, the data in the level register $LR_1$ is transferred to the level register $LR_2$. Then by another sequence instruction SET $P_1$ at address 6, the gate $G_4$ opens and a logical OR combination of flip-flops $FF_2$ and $FF_3$ by OR circuit is transferred to the flip-flops $FF_3$. On the other hand, the gate $Gd$ is opened only when the flip-flop $FF_2$ is on (i.e., both $P_2$ and $\overline{X}_2$ are on). If the level of the level register $LR_2$ is smaller than that of the level register $LR_3$, the comparator $COMP_2$ generates an output of data in the level register $LR_2$, which is stored in the level register $LR_3$. Then the level of the relay point $P_1$ is read from the memory 5. This level is compared with the level of the level register $LR_3$ by the comparator $COMP_3$. When the level of the relay point $P_1$ is larger than or equal to that of the level register $LR_3$, the gate $G_5$ is opened whereby the data in the flip-flop $FF_3$ is stored in the memory 5. When the level of the relay point $P_1$ is smaller than that of the level register $LR_3$, the binary code 0 is stored in the $P_1$ memory part. Then the level of the relay point $P_1$ is read from the memory 5. This level is compared with the level of the level register $LR_3$ by the comparator $COMP_3$. When the level of the relay point $P_1$ is larger than or equal to that of the level register $LR_3$, the gate $Ge$ is opened, and 1 is added to the data in the level register $LR_3$. The result of data is stored in the $P_1$ memory part of the memory 5. When the level of the relay point $P_1$ is smaller than that of the level register $LR_3$, the $P_1$ memory part of the memory 5 is set to a maximum level value MAX. In the above manner, the Boolean algebraic equation, $P_1 = X_1 + X_3 \cdot P_3 + X_2 \cdot P_2$, is executed by the sequence instructions at addresses 1 to 6.

The operation of the relay sequence will further be described in terms of Boolean Eq. (6), $P_2 = \bar{X}_3 \cdot P_1 + \bar{X}_6 \cdot P_4$ as summarized below.

| Memory Address | Sequence Instruction | | Processing | |
|---|---|---|---|---|
| 7 | LOAD $\bar{X}_3$ | ① $\bar{X}_3 \rightarrow FF_1$ | ① $L(\bar{X}_3) \rightarrow LR_1$ | |
| | | ② $FF_1 \rightarrow FF_2$ | ② $LR_1 \rightarrow LR_2$ | |
| | | ③ $0 \rightarrow FF_3$ | ③ $MAX \rightarrow LR_3$ | |
| 8 | AND $P_1$ | ① $P_1 \rightarrow FF_1$ | ① $L(P_1) \rightarrow LR_1$ | |
| | | ② $FF_1 \cdot FF_2 \rightarrow FF_2$ | ② $LR_1 \rightarrow LR_2$ when $LR_1 > LR_2$ | |
| 9 | OR $\bar{X}_6$ | ① $\bar{X}_6 \rightarrow FF_1$ | ① $L(\bar{X}_6) \rightarrow LR_1$ | |
| | | ② $FF_1 + FF_2 \rightarrow FF_2$ | ② $LR_2 \rightarrow LR_3$ only when $FF_2 = 1$, and $LR_3 < LR_2$ | |
| | | ③ $FF_1 \rightarrow FF_2$ | ③ $LR_1 \rightarrow LR_2$ | |
| 10 | AND $P_4$ | ① $P_4 \rightarrow FF_1$ | ① $L(P_4) \rightarrow LR_1$ | |
| | | ② $FF_1 \cdot FF_2 \rightarrow FF_2$ | ② $LR_1 \rightarrow LR_2$ when $LR_1 > LR_2$ | |
| 11 | SET $P_2$ | ① $FF_2 + FF_3 \rightarrow FF_3$ | ① $LR_2 \rightarrow LR_3$ only when $FF_2 = 1$ and $LR_3 < LR_2$ | |
| | | ② $FF_3 \rightarrow OUT\ P_2$ when $L(P_2) \geq LR_3$ | ② $LR_3 + 1 \rightarrow L(P_2)$ when $L(P_2) \geq LR_3$ | |
| | | $0 \rightarrow OUT\ P_2$ when $L(P_2) < LR_3$ | $MAX \rightarrow L(P_2)$ when $L(P_2) < LR_3$ | |

More specifically, when a sequence instruction LOAD $\bar{X}_3$ at address 7 is read from a memory in the sequence program part 4, this instruction is decoded and the state of input contact $\bar{X}_3$ is stored in the flip-flop $FF_1$. Then the gate $G_1$ is opened whereby the data in the flip-flop $FF_1$ is stored in the flip-flop $FF_2$, and the binary code 0 is stored in the flip-flop $FF_3$. On the other hand, the level 0 of the contact $\bar{X}_3$ is registered in the level register $LR_1$. When the gate $Ga$ opens, the data in the level register $LR_1$ is transferred to the level register $LR_2$. The level register $LR_3$ is set to a maximum level value. Then, by another sequence instruction AND $P_1$ at address 8, the state of the relay point $P_1$ is read from the memory 5 and stored in the flip-flop $FF_1$. The gate $G_2$ opens and a logical AND combination of flip-flops $FF_1$ and $FF_2$ by AND circuit is stored in the flip-flop $FF_2$. The level of the relay point $P_1$ which is stored in the memory 5 is registered in the level register $LR_1$. When the level of the level register $LR_1$ is larger than that of the level register $LR_2$, the comparator $COMP_1$ generates an output of data in the level register $LR_1$. Then the gate $Gb$ is opened and this data is stored in the level register $LR_2$. After this set, the state of input contact $X_6$ is stored in the flip-flop $FF_1$ by another sequence instruction OR $\bar{X}_6$ at address 9. Then the gate $G_4$ is opened and a logical OR combination of flip-flops $FF_2$ and $FF_3$ by OR circuit is stored in the flip-flop $FF_3$. The gate $G_1$ is opened whereby the data in the flip-flop $FF_1$ is transferred to the flip-flop $FF_2$. The level 0 of the input contact $\bar{X}_6$ is stored in the level register $LR_1$. The gate $Ga$ opens only when the flip-flop $FF_2$ is on. If the level of the level register $LR_2$ is smaller than that of the level register $LR_3$, the comparator $COMP_2$ generates an output of data in the level register $LR_2$, which is transferred to the level register $LR_3$. Then the gate $Ga$ is opened and the data in the level register $LR_1$ is transferred to the level register $LR_2$.

After this step, the state of the relay point $P_4$ is read from the memory 5 by another sequence instruction AND $P_4$ at address 10. This data is stored in the flip-flop $FF_1$. Then the gate $G_2$ is opened and a logical AND combination of flip-flops $FF_1$ and $FF_2$ by AND circuit is stored in the flip-flop $FF_2$. The level of the relay point $P_4$ which is stored in the memory 5 is read and stored in the level register $LR_1$. The gate $Gb$ is thereby opened, and when the level of the level register $LR_1$ is larger than that of the level register $LR_2$, the data in the level register $LR_1$ is transferred to the level register $LR_2$.

The gate $G_4$ is opened by another sequence instruction SET $P_2$ at address 11, and a logical OR combination of flip-flops $FF_2$ and $FF_3$ by OR circuit is transferred to the flip-flop $FF_3$. The gate $Gd$ is opened only when the flip-flop $FF_2$ is on. When the level of the level register $LR_2$ is smaller than that of the level register $LR_3$, the comparator $COMP_2$ generates an output of data in the level register $LR_2$, which is stored in the level register $LR_3$. Then, this level is compared with the level of the relay point $P_2$ by the comparator $COMP_3$. When the level of the relay point $P_2$ is larger than or equal to that of the level register $LR_3$, the gate $G_5$ opens whereby the data in the flip-flop $FF_3$ is stored in the $P_2$ memory part of the memory 5. When the level of the relay point $P_2$ is smaller than that of the level register $LR_3$, the binary code 0 is stored in the $P_2$ memory part. When the level of the relay point $P_2$ is larger than or equal to that of the level register $LR_3$, the gate $Ge$ opens and 1 is added to the data in the level register $LR_3$. The resultant data is stored in the $P_2$ memory part of the memory 5. When the level of the relay point $P_2$ is smaller than that of the level register $LR_3$, the $P_2$ memory part of the memory 5 is set to a maximum level value MAX. In the above manner, the Boolean equation, $P_2 = \bar{X}_3 \cdot P_1 + \bar{X}_6 \cdot P_4$, is executed on the sequence instructions at addresses 7 to 11.

In the same manner as above, Boolean Eqs. (7) to (10) can be converted respectively into sequence programs.

Figure 4:
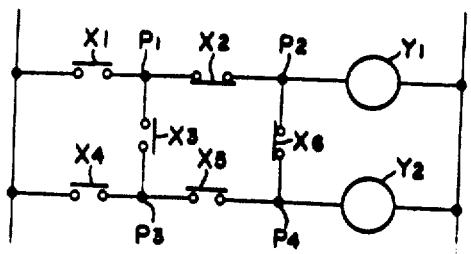
FIG. 4 is a diagram showing an example of a relay sequence comprising complicated loops.

Because this sequence program is executed repeatedly at high speed, the sequence controller shown in FIG. 5 performs functions equivalent to those of the relay sequence shown in FIG. 4.

According to the invention, as has been described above, the branch points where input contacts and/or relay contacts on a sequence diagram are connected to each other are used as relay points. The on and off states of these relay points and the levels corresponding to the number of relay points by way of which one relay point is turned on are stored in a memory and a given data is processed according to the level. Accordingly, the sequence program can be set up exactly according to Boolean algebraic equations using relay points. Because these Boolean equations can be easily derived, this sequence controller can provide a sequence program quickly and accurately. In other words, the sequence controller of this invention can readily be adapted to a wide variety of sequence control applications.

While one preferred embodiment of the invention has been described and illustrated in detail, it is to be clearly understood that this should not be construed as necessarily limiting the scope of the invention, since it is apparent that many changes can be made to the disclosed principles by those skilled in the art in order to suit particular applications.

What is claimed as new and desired to be secured by Letters Patent of the United States is:

1. A sequence controller comprising:
   an input selection circuit;
   a logical processing circuit;
   an output control circuit;
   a sequence program storage circuit;
   a memory circuit;
   means connecting a plurality of input contacts to the input selection circuit;
   means connecting the input selection circuit to the logical processing circuit;
   means connecting the logical processing circuit and the memory circuit;
   means connecting the memory circuit and the logical processing circuit to the output control circuit;
   means connecting the sequence program storage circuit to the logical processing circuit;
   means connecting a plurality of output relays to the output control circuit to be controlled thereby;
   the sequence program storage circuit storing a relay sequence having branch points;
   the level of each branch point and its on-off state being stored in the memory circuit;
   whereby data from the plurality of input contacts is processed in accordance with the relay sequence stored in the sequence program storage circuit to control the output relays.

2. A sequence controller as claimed in claim 2 wherein the logical processing circuit comprises:
   a logical processing part for performing logical operations in accordance with a Boolean algebraic equation and
   a level processing part for processing the levels of the branch points.

3. A sequence controller as claimed in claim 2 wherein the logical processing part comprises:
   a first memory circuit for temporarily storing input data,
   a second memory circuit for temporarily storing data stored in the first memory circuit,
   an AND circuit for performing AND logic on the data stored in the first and second memory circuits and supplying the resultant data to the second memory circuit,
   a third memory circuit for receiving and storing an initial set signal and
   an OR circuit for performing OR logic on the data stored in the second and third memory circuits and supplying the resultant data to the third memory circuit to be derived as an output.

4. A sequence controller as claimed in claim 2 wherein the level processing part comprises:
   a first level register for temporarily storing an input level,
   a second level register for receiving and temporarily storing the level stored in the first level register,
   a first comparator for comparing the level of the first level register with the level of the second level register and supplying the larger level to the second level register,
   a third level register for receiving and storing an initial set signal,
   a second comparator for comparing the level stored in the second level register with the level stored in the third level register and supplying the smaller level to the third level register, and
   a third comparator for comparing the level stored in the third level register with the level of a branch point stored in the memory means and generating an output signal representing the smaller level plus one.

5. A sequence controller as claimed in claim 2 wherein the logical processing part comprises:
   first, second, third and fourth gates,
   a first flip-flop for temporarily storing input data,
   a second flip-flop for receiving the output of the first flip-flop through the first gate,
   an AND element for performing AND logic on the output of the first flip-flop and the output of the second flip-flop and supplying the resultant data to the second flip-flop through the second gate,
   a third flip-flop for receiving an initial set signal through the third gate,
   an OR element for performing OR logic on the output of the second flip-flop and the output of the third flip-flop and supplying the resultant data to the third flip-flop through the fourth gate,
and wherein the level processing part comprises:
   fifth, sixth, seventh and eighth gates,
   a first level register for temporarily storing an input level,
   a second level register for receiving the output of the first level register through the fifth gate,
   a first comparator for comparing the output of the first level register with the level of the second level register and supplying the larger level to the second level register through the sixth gate,
   a third level register for receiving an initial set signal through the seventh gate,
   a second comparator for comparing the output of the second level register with the output of the third level register and supplying the smaller level to the third level register through the eighth gate,
   a third comparator for comparing the output of the third level register with the output of a branch point level stored in the memory circuit and generating an output signal representing the smaller level plus one
   whereby the output of the third flip-flop of the logical processing part and the output of the third comparator of the level processing part are stored in the memory circuit.

* * * * *